May 26, 1925.
L. B. SCHELL
SHOCK ABSORBER
Filed Nov. 6, 1922
1,538,955
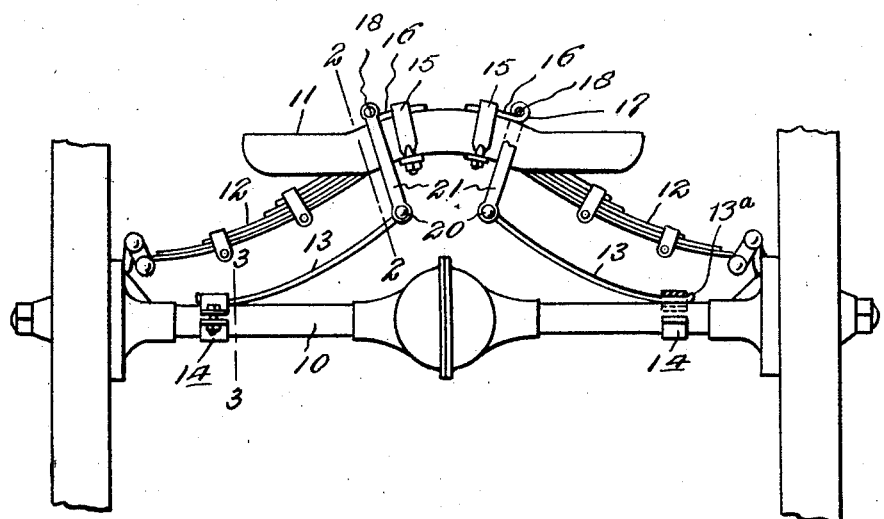
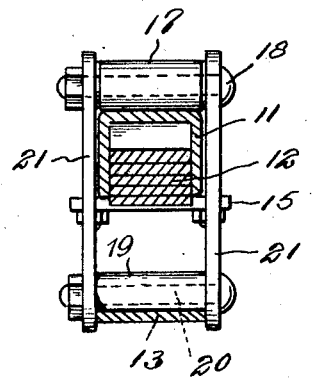
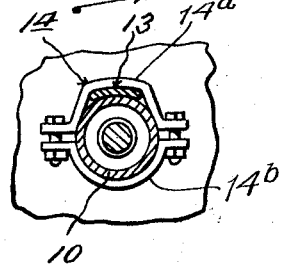
Witnesses:
F. L. Fox
Inventor
L. B. Schell,
By Geo. P. Kimmel.
Attorney

Patented May 26, 1925.

1,538,955

UNITED STATES PATENT OFFICE.

LOUIS B. SCHELL, OF TAMPA, FLORIDA, ASSIGNOR OF ONE-HALF TO D. B. MILLS, OF WEST TAMPA, FLORIDA.

SHOCK ABSORBER.

Application filed November 6, 1922. Serial No. 599,300.

*To all whom it may concern:*

Be it known that I, LOUIS B. SCHELL, a citizen of the United States, residing at Tampa, in the county of Hillsborough and State of Florida, have invented certain new and useful Improvements in Shock Absorbers, of which the following is a specification.

This invention relates to improvements in shock absorbers for attachment to vehicles, more particularly to motor driven vehicles, to coact with the ordinary springs of the vehicle, to absorb the rebound or shocks produced when the vehicle is operating over rough roads.

Another object of the invention is to provide a device of this character which may be readily adapted without material structural change to the axles and bodies of motor driven vehicles of various makes and forms.

With these and other objects in view the invention consists in certain novel features of construction as hereinafter shown and described and then specifically pointed out in the claims, and in the drawings illustrative of the preferred embodiment of the invention—

Figure 1 is a rear elevation of the rear axle, the rear bolster, and the rear springs, of a conventional motor driven vehicle, with the improvement applied.

Fig. 2 is an enlarged transverse section on the line 2—2 of Fig. 1.

Fig. 3 is an enlarged transverse section on the line 3—3 of Fig. 1.

For the purpose of illustration the improved device is shown applied to the rear part of a motor driven vehicle, including the rear axle casing 10, the rear bolster 11 and the rear spring 12.

The improved device comprises resilient bars 13 each having its outer end upturned as at 13ª to prevent the clip member 14 which secures this end to the axle casing 10 as shown, from slipping therefrom. This clip member as shown in Figure 3, is formed in two parts 14ª and 14ᵇ respectively, the part 14ᵇ being semi-circular and having laterally extending end portions as shown, while the part 14ª is substantially A-shaped but has similar laterally extending portions, which oppose and are secured to the end portions of part 14ᵇ. As is seen the formation of part 14ª is such that the end of the bar 13 is securely engaged over its top and tightly held against the axle housing 10.

Rigidly connected by clamp devices 15 to the bolster member 11 are plate members 16 each having one end rolled to provide a bearing 17 to receive a pivot pin 18.

At their inner ends each of the resilient bars 13 is likewise provided with a loop or eye 19 to respectively receive pins 20.

Swingingly coupled to the pins 18 and 20 are link devices 21, which, as shown extend one on each side of the spring and bolster 11 and 12.

The resilient members 13 thus serve as auxiliary yieldable supports or springs located between the main springs 12 and the axle and its casing and reinforces the main spring and prevents undue deflection of the same, and likewise effectually prevents the rebound after abnormal downward strain and absorbing the shocks which are liable to occur when running over rough or uneven roads.

The improved device is simple in construction, can be readily applied to springs and other running gear of the vehicle without material structural change either in the vehicle or in the attachment.

The preferred embodiment of the invention is disclosed in the drawings and set forth in the specifications, but it will be understood that modifications within the scope of the claims may be made in the construction without departing from the principle of the invention or sacrificing any of its advantages.

Having thus described the invention what is claimed as new is:

1. The combination with a vehicle axle, spring and bolster, of a shock absorber comprising means to provide a pair of bearings upon said bolster, a pivot pin through each bearing, a pair of link devices pivotally suspended from each pivot pin, the links of each pair being separated by said bolster, a pair of resilient spring bars each having one end pivotally supported between the lower ends of a pair of links and having their other ends extended in opposite directions and resting upon said axle, and clamp devices engaging the extended end of each bar to secure the same to said axle.

2. The combination with a vehicle axle, spring and bolster, of a shock absorber comprising means to provide a pair of bearings upon said bolster, a pivot pin through each bearing, a pair of link devices pivotally suspended from each pivot pin, the links of each pair being separated by said bolster, a pair of resilient spring bars each having one end pivotally supported between the lower ends of a pair of links and having their other ends extended in opposite directions and resting upon said axle, and clamp devices engaging the extended end of each bar to secure the same to said axle, each of said bars having its extended end upturned to prevent the same from slipping from beneath the clamp.

In testimony whereof, I affix my signature hereto.

LOUIS B. SCHELL.